INVENTORS
LAWRIE G. McINTOSH
JOHN A. MERRICK

BY: *Church & Rogers*
ATTORNEYS

United States Patent Office 3,334,368
Patented Aug. 8, 1967

3,334,368
LOADING RAMPS
Lawrie G. McIntosh, Toronto, Ontario, and John A. Merrick, Dundas, Ontario, Canada, assignors to Service Steel & Engineering Limited, Hamilton, Ontario, Canada
Filed Jan. 12, 1965, Ser. No. 424,931
14 Claims. (Cl. 14—71)

This invention is concerned with improvements in or relating to loading ramps of the kind employed to provide a bridge extending between a loading dock and a vehicle, such as a truck, railway car, etc. in close proximity to the dock.

Such a ramp is used with vehicles that often have a floor height different from the height of the dock, and also accommodates changes in the vehicle floor height as it is loaded and unloaded. One form of ramp known hitherto comprises a frame and a ramp plate mounted therein by two spaced parallel connecting arms, each pivoted at one end to the frame and at the other end to the underside of the plate near to the front edge thereof. When not in use the plate usually rests in a rear storage position. With the vehicle at the desired position relative to the dock, an operator lifts the plate forward and upward in an upwardly arcuately extending path determined by the pivoted connecting arms. When the plate passes through an intermediate uppermost position it will descend and move forward under its own weight until it reaches a forward loading position in which its front edge rests on the vehicle, which may be level with, above or below the general level of the dock.

Because of its necessarily robust construction the plate is heavy and difficult to lift by hand, and one ramp construction known hitherto uses sets of springs to oppose the weight of the plate and make it easier to operate, one spring set opposing the weight in one direction of movement and the other set opposing the weight in the other direction.

It is an object of the present invention to provide a new loading ramp construction employing spring means for opposing the weight of the plate.

It is another object to provide a new loading ramp construction comprising new manually operable means for moving the ramp plate between its said rear and forward positions.

Figure 1:
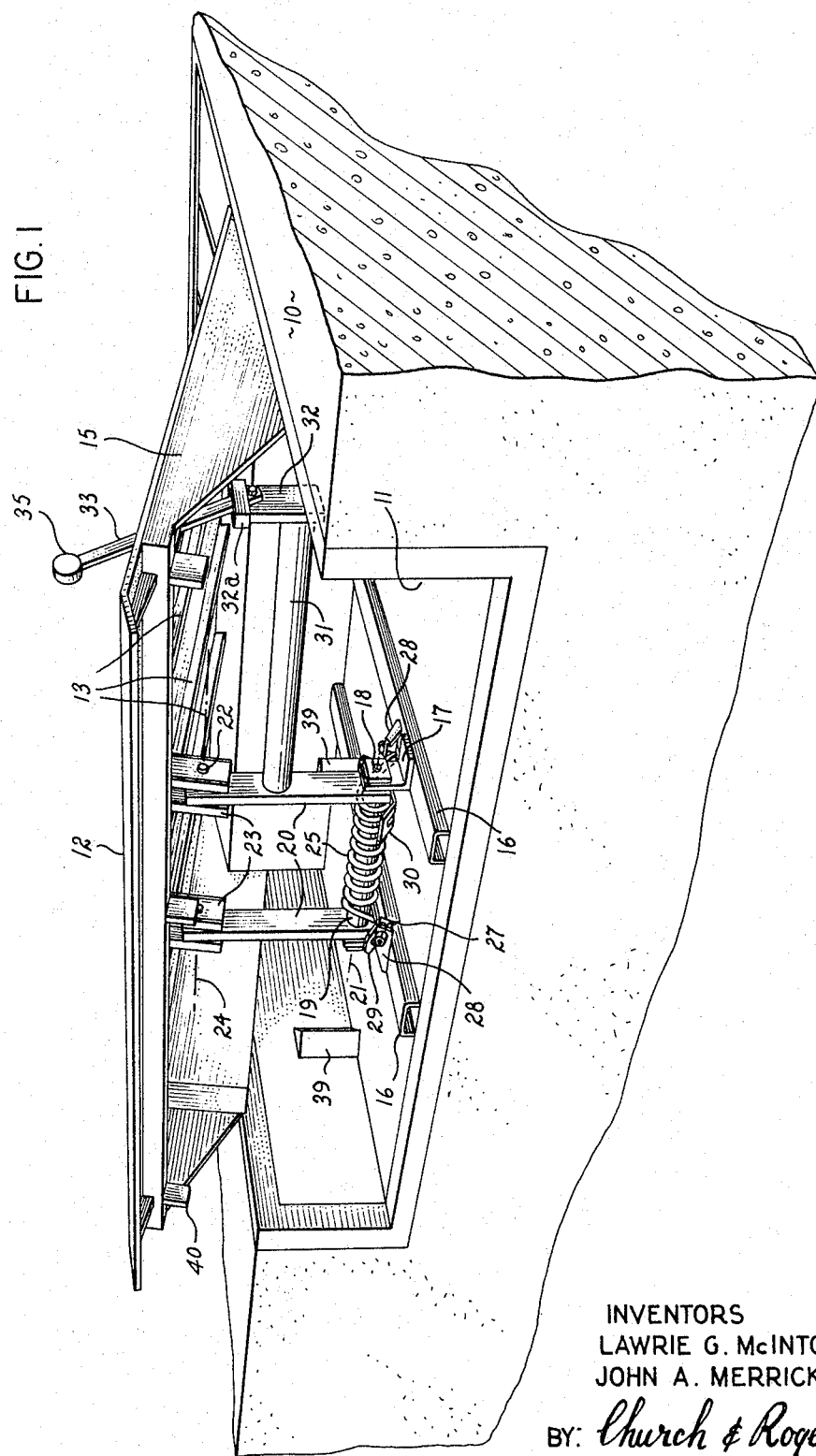
Figure 2:
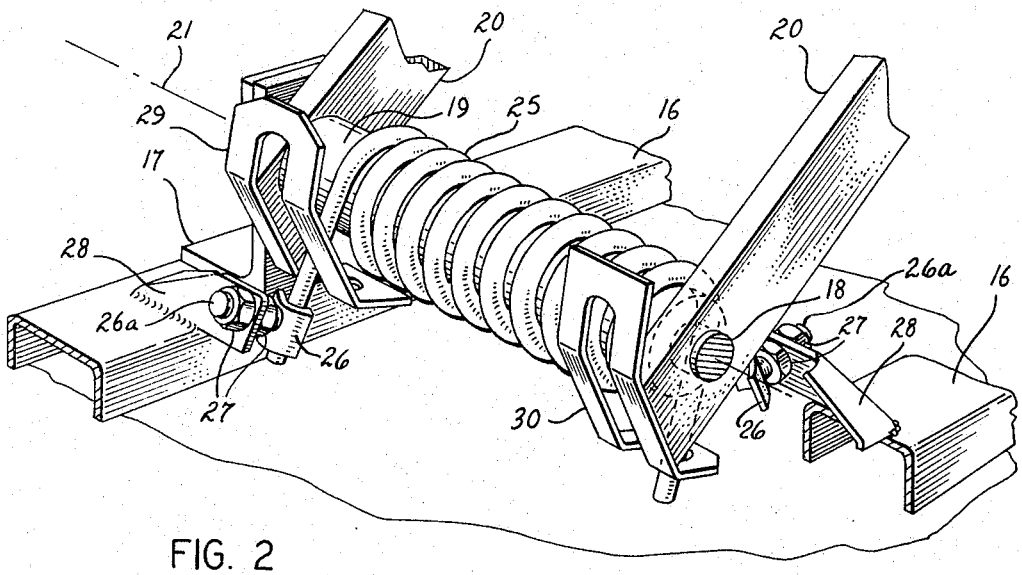
Figure 3:
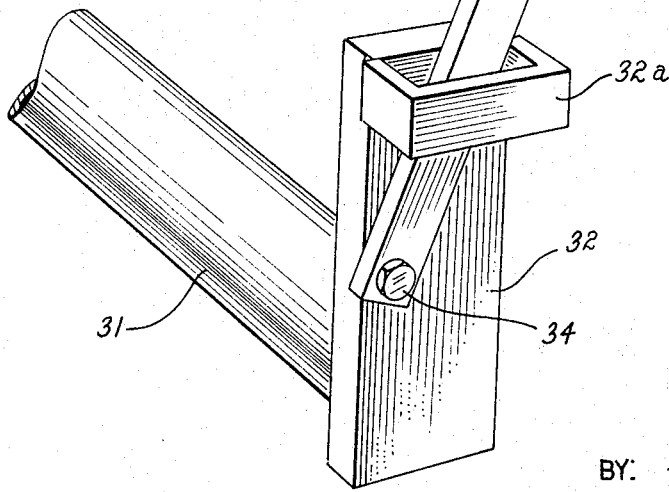
Figure 4:
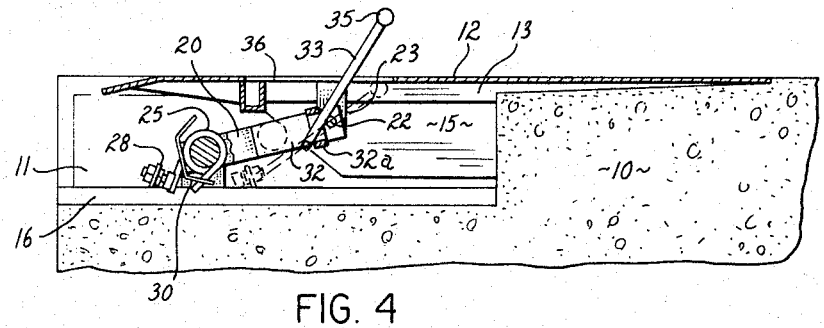
Figure 5:
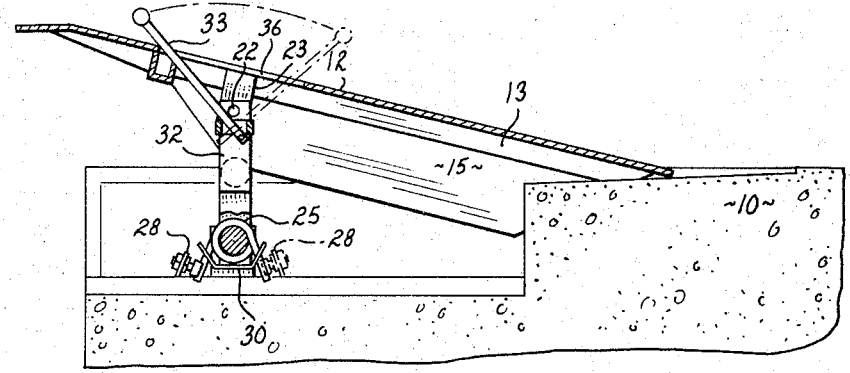
Figure 6:
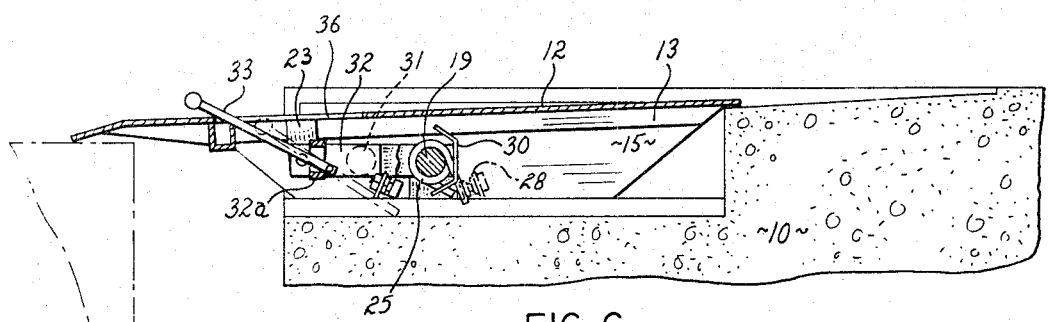

A particular preferred embodiment of the invention will now be described, by way of example, with reference to the accompanying drawing wherein:

FIGURE 1 is a perspective view of the whole loading ramp,

FIGURE 2 is a similar view showing in detail the arrangement of the torsion spring, FIGURE 3 is a similar view showing in detail the arrangement of the ramp handle, and FIGURES 4, 5, and 6 are side views, similar to one another, with the ramp plate side removed and parts broken away to show the operative mechanism clearly, the ramp plate being shown respectively in its rear storage, intermediate and forward operative positions.

The loading dock with which the ramp is associated is indicated generally by the reference 10. In this particular embodiment the loading ramp comprises a box 11 at the top and one side and mounted on a corresponding recess in the dock, and a ramp plate 12 having longitudinally extending stiffeners 13 and longitudinally and downwardly extending protective side plates 15. A pair of channels 16 are fixed to the floor of the box and each has an L-section bracket 17 fastened thereto. A pair of pivot pins 18 extend through the respective vertically extending webs of the brackets 17 and mount for pivoting movement relative thereto connecting arm means comprised of a pair of spaced parallel connecting arms 20 which are rigidly connected together by an interposed rod-like tubular spacing connecting member 19, the pins 18 pivoting the arms to the brackets 17 adjacent their ends about respective coextensive axes indicated by 21. The other ends of the connecting arms 20 are each pivoted to the underside of the plate, near to the front edge thereof, by means of respective pivot pins 22 passing through the arms and mounted in downwardly projecting members 23 fastened to the underside of the ramp plate, the pivot axes 24 of the pins 22 being coextensive with one another and being parallel to the axes 21. It will be seen that as the ramp plate moves from a rear storage position shown in FIGURE 4 to a forward operative position shown in FIGURE 6, its front edge follows an upwardly arcuately extending path whose radius is determined by the distance between the pivot axes 21 and 24, and the plate passes through an intermediate uppermost position shown in FIGURES 1 and 5.

In this particular embodiment the box 11, the channels 16 and the brackets 17 may together be regarded as a ramp base on which the ramp plate is mounted by the connecting arms 20 for the desired movement, but in other embodiments other means may be employed. In particular, for example, it is contemplated that in some embodiments the box 11 and the channels 16 will be omitted and the brackets 17, or their equivalent members, will be fastened directly to the loading dock 10. For convenience in terminology the term "base" is used in the appended claims, but it is to be understood that this term is not used in a limiting sense.

A helically-wound, torsion, coil spring 25 is provided to assist the operator in lifting the ramp plate from its rear storage and forward operative positions, and is mounted around the tubular member 19, so that the latter serves as a supporting mandrel for the spring. The two ends of the spring are engaged by respective adjustable fixed stop means, each comprising an arcuate spring contact member 26 mounted on a screw-threaded rod 26a that is held by two nuts 27 in a bracket 28 fixed to the respective channel 16. Two slotted spring engaging members 29 and 30 are fixed to respective arms 20 and each has the immediately adjacent end of the spring protruding through its slot. In this particular embodiment, in the intermediate position illustrated in FIGURES 1 and 5, the two spring ends are engaged with their respective fixed stops 26, 27, and 28, while neither of the members 29 and 30 is in effective engagement with its respective spring end. It is contemplated that in some embodiments in this position one or both ends of the spring will not be in contact with its associated adjustable stop, while each of the members 29 and 30 may or may not be in effective engagement with its respective spring end.

In this intermediate position the weight of the plate acts vertically downwards through the pivot axes 21 and 24 and the connecting arms 20, and there is no appreciable forward or backward acting component. As the ramp plate is moved toward the extreme forward operative position illustrated in FIGURE 6 its weight becomes effective to move it downwards and forwards, and after travel forward of a predetermined extent the member 29 effectively engages the respective end of the spring, and further movement of the plate can only take place against the opposition of the spring, since its other end is held against rotation by the respective adjustable stop. In an embodiment in which the spring ends are not engaged with the adjustable fixed stops the initial effective engagement of, for example, the member 29 with its associated spring end will cause the spring to rotate until its other end engages the associated fixed stop. Similarly, as the ramp plate is moved toward the extreme rear storage position illustrated in FIGURE 4, after a predetermined amount of movement the member 30 effectively engages its respective spring end with resultant opposition of the loaded spring to the weight of the plate, this position not only assisting the operator in lifting the ramp plate but also causing it to lower relatively gently to its desired position. In this embodiment the points in the path of travel of the ramp plate at which the members 29 and 30 effectively engage the spring ends can be adjusted by means of the above-described adjustable stops 26, 27 and 28, such adjustments being effective to determine the amount of assistance given to the operator by the spring.

It is also contemplated that in other embodiments instead of, or in addition to, the adjustment in the said points provided by the stops 26, 27 and 28 the members 29 and 30 will be adjustable for the same purpose, for example by means of an adjustable mounting between the members 29 and 30 and their respective connecting arms 20.

Although in the embodiment particularly described a single assembly comprising a pair of connecting arms 20 and associated single spring 25 etc. is employed, it is contemplated that in other embodiments more than one such assembly will be used, so that the same assembly can be applied to both light and heavy ramps by suitable choice of the number of assemblies to be used. When more than one assembly is used all of the connecting arms can be connected rigidly together, although in some embodiments this may not be necessary and a suitably rigid connection will be provided by the ramp plate itself.

For convenience of operation it is desirable to provide some form of handle for the operator by which the ramp plate can be moved at will, but which will not obstruct the normal use of the ramp. To this end completely separate handles have been provided hitherto, which are when required hooked under the edges of slots in the ramp plate, but these have not been particularly satisfactory, since they must be stored near to the ramp for convenience in use and do not offer any mechanical advantage in the handling of the ramp plate.

In a ramp in accordance with this invention manually operable self-storing means for moving the ramp plate comprise a rod-like tubular extension member 31 rigid with one of the connecting arms 20 and having its longitudinal axis generally parallel to the axes 21 and 24. A stub arm 32 rigid with the member 31 extends parallel to the connecting arms 20, and an extension arm or lever 33 is connected to the stub arm by a collar 32a rigidly fixed to the stub arm 32 and embracing the extension arm 33. One end of the extension arm 33 is provided with a stop member constituted by a bolt 34, while the other end is provided with an enlarged head 35 suitable for grasping by the hand of an operator and capable of passing freely through an elongated slot 36 in the ramp plate 12, the direction of elongation of the slot 36 being parallel to the ramp plate side edges and the planes of movement of the arms 20, 32, and 33.

The collar 32a permits the extension arm 33 to move freely longitudinally therethrough within the limits set by the stop bolt 34 and the head 35 and the width and depth of the aperture in the collar, parallel to the ramp plate side edges, are such relative to the corresponding width dimension of the extension arm, that it permits limited rotational movement of the extension arm in the plane of its own movement. In this specific embodiment the extent of this rotational movement is approximately a right angle, though in other embodiments larger or smaller angular movements may be permitted, as will be apparent from the description of operation below, the effect of the rotational movement being that the angular movement of the extension arm is substantially less than the corresponding angular movement of the connecting arms 20, so that the extension arm is more easily manipulated by the operator.

Assuming that the ramp plate 12 is in the rearmost position shown in FIGURE 4, the extension arm 33 is normally in a retracted position shown in broken lines, in which its head 35 is held just below the level of the plate top surface by a retaining ring 37 (FIGURE 3) that embraces the extension arm and rests on two L-section members 38 fastened underneath the ramp plate. In this position the head 35 can readily be grasped by an operator and simultaneously pulled longitudinally and rotated anticlockwise to the position shown in solid lines in FIGURE 4, in which the stop 34 engages the collar 32a and the limit of the rotational movement is reached. The arm 33 now becomes virtually a rigid extension of the stub arm 32 and can be used to pull or push the ramp plate from its rear position toward the intermediate position shown in FIGURE 5, the additional length of the extension arm 33 providing a mechanical advantage, which in the embodiment illustrated is about 2:1. If the extension arm 33 is also to be used to control the downward movement of the ramp plate, then at a point in the path of travel of the ramp plate near to the intermediate position illustrated in FIGURE 5 the extension arm is rotated relative the stub arm and the connecting means, from the extreme position shown in solid lines in FIGURE 5 to the other extreme position show in broken lines, in which it again becomes virtually a rigid extension of the stub arm and can be used in the manner desired. When the ramp plate has reached its furthest forward position shown in FIGURE 6 the relative longitudinal movement permitted by the collar connecting means 32a permits the extension arm 33 to be returned to a retracted storage position, illustrated in broken lines in FIGURE 6, just below the ramp plate top surface, as determined by the retainer ring 37. A similar function of the self-storing manually operable means is obtained when moving the ramp plate from the forward to the rear position.

In some of the embodiments contemplated, for example those in which the box 11 is omitted, it may be possible to locate the self-storing handle means to one side of the ramp plate, so that there is no need to provide a slot therefor in the ramp plate, and in some cases retaining means such as the members 37 and 38 may also not be required.

In the embodiment particularly described the spring 25 is disposed with its longitudinal axis coaxial with the axes 21, but it will be apparent that this is not necessarily the case, and it can be disposed to have the said longitudinal axis coaxial with the axes 24.

The embodiments of the invention in which an exclusive property or privileges is claimed are defined as follows:

1. A loading ramp comprising a base, a ramp plate, and means mounting the ramp plate for upwardly arcuately extending movement from a rear stored position through an intermediate position to a forward loading position, and vice versa, said mounting means comprising a pair of spaced substantially parallel connecting arms, means pivoting said connecting arms adjacent one end to the base about respective coextensive first pivot axes and adjacent the other end to the underside of the ramp plate about respective coextensive second pivot axes parallel to the said first pivot axes, a helically wound torsion coil spring disposed with its longitudinal axis coextensive with one of said pivot axes, a pair of spaced spring engaging means carried by one connecting arm adjacent the spring and operatively engageable with a respective end portion of the spring upon downward movement of the ramp plate beyond said intermediate position toward respectively said forward and said rear positions to wind the spring and oppose the weight of the ramp plate with the spring force, and spaced stop means for engaging the end of the spring opposite to that engaged by the operative spring engaging means for maintaining torsion in the spring during the said winding of the spring.

2. A loading ramp as defined in claim 1, wherein the said stop means comprising first and second adjustable stops, each stop being adjustable for corresponding movement of the respective spring end portion in the directions for winding and unwinding of the spring for adjustment of the extent of downward movement of the ramp plate from the said intermediate position before the respective spring engaging means engages the corresponding end portion of the spring.

3. A loading ramp comprising a base, a ramp plate, and means mounting the ramp plate for upwardly arcuately extending movement from a rear stored position through an intermediate position to a forward loading position, and vice versa, said mounting means comprising a pair of spaced substantially parallel connecting arms, means pivoting said connecting arms adjacent one end to the base about respective coextensive first pivot axes and adjacent the other end to the underside of the ramp plate about respective coextensive second pivot axes parallel to the said first pivot axes, a helically wound torsion coil spring disposed with its longitudinal axis coextensive with one of said first and second coextensive pivot axes, first spring engaging means movable with one connecting arm and operative with a respective end portion of the spring upon downward movement of the ramp plate beyond the said intermediate position toward said forward position to wind the spring and oppose the weight of the ramp plate with the spring force, second spring engaging means movable with the other connecting arm and operative with the respective other end portion of the spring upon downward movement of the ramp plate beyond said intermediate position toward said rear position to wind the spring and oppose the weight of the ramp plate with the spring force, and stop means for engaging the end of the spring opposite to that engaged by the operative spring engaging means for maintaining torsion in the spring during the said winding of the spring.

4. A loading ramp as defined in claim 3, wherein said stop means comprises first and second adjustable stops engageable with the respective end portions of the spring, each stop being adjustable for corresponding movement of the respective spring end portion in the directions for winding and unwinding of the spring for adjustment of the extent of downward movement of the ramp plate from the said intermediate position before the respective spring engaging means engages the corresponding end portion of the spring.

5. A loading ramp comprising a base, a ramp plate, and means mounting the ramp plate for upwardly arcuately extending movement from a rear stored position through an intermediate position to a forward loading position, and vice versa, said mounting means comprising a pair of spaced substantially parallel connecting arms, means pivoting said connecting arms adjacent one end to the base about respective coextensive first pivot axes and adjacent the other end to the underside of the ramp plate about respective coextensive second pivot axes parallel to the said first pivot axes, rod-like connecting means having its longitudinal axis coextensive with said second pivot axes and rigidly connecting the two connecting arms for movement together with one another, a helically wound torsion coil spring disposed around said rod-like means which constitute a mandrel for the spring and first, second spring engaging means each associated with and movable with a respective one of the connecting arms and operative with a respective end portion of the spring upon downward movement of the ramp plate beyond said intermediate position toward respectively said forward and rear positions to wind the spring and oppose the weight of the ramp plate with the spring force, and stop means mounted on the base for engaging the end of the spring opposite to that engaged by the operative spring engaging means for maintaining torsion in the spring during the said winding of the spring.

6. A loading ramp as defined in claim 5, wherein said stop means comprises first and second adjustable stops engageable with the respective end portions of the spring, each stop being adjustable for corresponding movement of the respective spring end portion in the directions for winding and unwinding of the spring for adjustment of the extent of downward movement of the ramp plate from the said intermediate position before the respective spring engaging means engages the corresponding end portion of the spring.

7. A loading ramp comprising a base, a generally rectangular ramp plate having generally parallel front and rear edges and generally parallel side edges, and means mounting the ramp plate for upwardly arcuately extending movement parallel to said side edges from a rear stored position through an intermediate position to a forward loading position, and vice versa, said mounting means comprising a pair of spaced generally parallel connecting arms, means pivoting said connecting arms adjacent one end to the frame about respective coextensive first pivot axes and adjacent the other end to the underside of the ramp plate about respective coextensive second pivot axes generally parallel to the said first pivot axes and to said ramp plate front and rear edges, a longitudinally extending rod-like member having its longitudinal axis coextensive with one of the said first and second pivot axes and rigidly connecting the said two connecting arms for movement together with one another, a helically wound torsion coil spring disposed around said rod-like member which constitutes a mandrel for said spring, first and second spring engaging means each associated with and movable with a respective one of the connecting arms and operative with a respective end portion of the spring upon downward movement of the ramp plate beyond said intermediate position toward respectively said forward and rear positions to wind the spring and oppose the weight of the ramp plate with the spring force, and first and second adjustable stop means engageable with the respective end portions of the spring, for maintaining the spring in torsion, each stop means being adjustable for corresponding movement of the respective spring end portion in the directions for winding and unwinding of the spring for adjustment of the extent of downward movement of the ramp plate from the said intermediate position before the respective spring engaging means engages the corresponding end portion of the spring.

8. A loading ramp comprising a base, a ramp plate, connecting arm means pivoted to the base and the ramp plate about respective pivot axes and mounting the ramp plate for upwardly arcuately extending movement from a rear stored position through an intermediate position to a forward loading position, and vice versa, a helically wound torsion coil spring disposed with its longitudinal axis coextensive with one of said pivot axes, spring engaging means movable with said connecting arm means and operative with a respective end portion of the spring upon downward movement of the ramp plate beyond said intermediate position toward respectively said forward and said rear positions to wind the spring and oppose the weight of the ramp plate with the spring force, and stop means operatively cooperating with the spring and the respective spring engaging means for maintaining torsion in the spring during the said winding of the spring.

9. A loading ramp as defined in claim 8, wherein said stop means comprises first and second adjustable stops engageable with the respective end portions of the spring, each stop being adjustable for corresponding movement of the respective spring end portion in the directions for winding and unwinding of the spring for adjustment of the extent of downward movement of the ramp plate from the said intermediate position before the respective spring engaging means engages the corresponding end portion of the spring.

10. A loading ramp comprising a base, a ramp plate, and means mounting the ramp plate for upwardly arcuately extending movement from a rear stored position through an intermediate position to a forward loading position, and vice versa, said mounting means comprising a pair of spacer substantially parallel connecting arms, means pivoting said connecting arms adjacent one end to the base about respective coextensive first pivot axes and adjacent the other end to the underside of the ramp plate about respective coextensive second pivot axes parallel to the said first pivot axes, a helically wound torsion coil spring, spring engaging means movable with each of said connecting arms and operatively engageable with a respective end portion of the spring upon downward movement of the ramp plate beyond said intermediate position toward respectively said forward and said rear positions to wind the spring and oppose the weight of the ramp plate with the spring force, and stop means for engaging the end of the spring opposite to that engaged by the operative spring engaging means for maintaining torsion in the spring during said winding of the spring.

11. A loading ramp comprising a base, a ramp plate, connecting arm means pivoted to the base and the ramp plate about respective pivot axes and mounting the ramp plate for upwardly arcuately extending movement from a rear stored position through an intermediate position to a forward loading position, and vice versa, a helically wound torsion coil spring, spring engaging means moveable with said connecting arm means and operative with a respective end portion of the spring upon downward movement of the ramp plate beyond said intermediate position toward respectively said forward and said rear positions to wind the spring and oppose the weight of the ramp plate with the spring force, and stop means for engaging the end of the spring opposite to that engaged by the operative spring engaging means for maintaining torsion in the spring during said winding of the spring.

12. A loading ramp as defined in claim 11 including self-storing manually operable means for moving the ramp plate between said rear and forward positions, said self-storing means comprising an extension arm adapted to extend and move in a plane generally parallel to the plane of movement of the connecting arm means, and means operatively connecting said connecting arm means and the extension arm for sliding and limited rotational movement, said connecting means engaging said extension arm for longitudinal sliding movement thereof between an operative position in which it extends above the upper face of the ramp plate for engagement by the hand of an operator and a stored position in which it is disposed below the level of the ramp plate upper face, and for limited rotational movement thereof relative to the connecting arm means.

13. A loading ramp as defined in claim 12, wherein the said ramp plate has an elongated slot therein through which said extension arm is slidable and rotatable, said extension arm, when in the operative position, being rotatable for limited movement in said connecting means for positive engagement therewith for manually moving the ramp plate between said rear and said forward positions.

14. A loading ramp comprising a base, a ramp plate having an upper face, connecting arm means pivoted to the base and to the ramp plate about respective parallel pivoted axes and mounting the ramp plate for upwardly arcuately extending movement from a rear stored position through an intermediate position to a forward loading position, and vice versa, spring means, a pair of spring engaging means carried by the connecting arm means adjacent said spring means and operatively engageable with a respective end portion of the spring means to oppose the weight of the ramp plate with the spring force of the spring means upon downward movement of the ramp plate beyond said intermediate position toward the rear and forward position, and self-storing manually operable means for moving the ramp plate between said rear and forward positions, said self-storing means comprising a collar having an elongated opening therethrough rigidly connected to the connecting arm means with the passageway through said opening extending normal to said pivoted axes, and an extension arm loosely connected for longitudinal and limited rotational movement by said collar to the connecting arm means and movable therewith in a plane generally parallel to the plane of movement of said connecting arm means, said ramp plate having an elongated slot formed therein extending in the direction of the forward and rear movement of the ramp plate, said extension arm being longitudinally movable through said slot between a stored position disposed below the upper surface of the ramp plate and an operative position extending above the ramp plate upper surface and being rotatable in said operative position for engaging opposite ends of said elongated opening for manually moving the ramp plate between the rear and the forward positions.

References Cited
UNITED STATES PATENTS

| | | | |
|---|---|---|---|
| 2,337,138 | 12/1943 | Van Berg | 14—72 |
| 2,527,653 | 10/1950 | Pierce | 14—71 |
| 2,739,325 | 3/1956 | Grace | 14—72 |
| 2,908,024 | 10/1959 | Holleen | 14—71 |
| 3,122,764 | 3/1964 | Ambli | 14—71 |

JACOB L. NACKENOFF, *Primary Examiner.*